Figure 1:
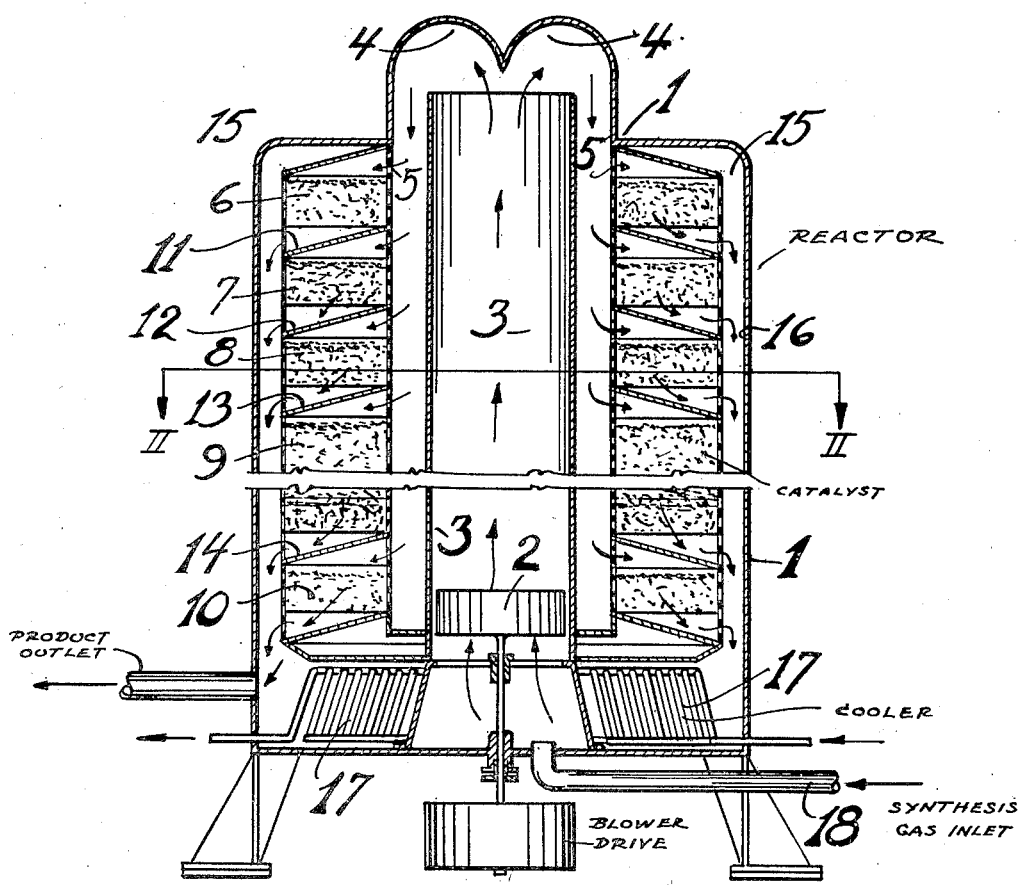

Frank T. Barr Inventor

Patented Sept. 18, 1945

2,384,874

UNITED STATES PATENT OFFICE 2,384,874

HYDROCARBON SYNTHESIS REACTION

Frank T. Barr, Summit, N. J., assignor, by mesne assignments, to Standard Catalytic Company, a corporation of Delaware Application May 2, 1941, Serial No. 391,560

4 Claims. (Cl. 260—449.6)

The present invention is concerned with the synthesis of hydrocarbons. The invention more particularly relates to the manufacture of hydrocarbon constituents containing more than one carbon atom in the molecule by a process involving the hydrogenation of oxides of carbon and is especially concerned with an improved method of controlling the rapid exothermic reaction and maintaining the temperature of the reaction within a predetermined critical temperature range. In accordance with the present process, the reaction is carried out in reaction zones in which a low pressure drop in the circulatory system results and in which the exothermic heat of reaction is removed by recirculating synthesis gases.

It is known in the art to remove the heat evolved in exothermic reactions by various means. For example, it is known to remove heat from exothermic chemical reactions by utilizing various liquid cooling mediums which are circulated without or within the reaction zone. These methods, however, are not entirely satisfactory in controlling the temperature within a relatively narrow temperature range which is essential in certain reactions as, for example, in reactions involving the hydrogenation of oxides of carbon.

Thus, other methods of removing the exothermic heat of reaction have been suggested. One method of removing the reaction heat in a synthesis reaction involving hydrogen and oxides of carbon is to circulate a relatively large quantity of synthesis gases and to cool the synthesis gases in the circuit. For example, by circulating about 100 times as much synthesis gas as is converted it is possible to maintain the reaction within about a 10° C. temperature range. The amount of input and outlet gas in this process is relatively small as compared to the total amount of synthesis gas circulated. As a result of the removal of reactants during circulation, the percentage of unreacted materials in the circulating gas ordinarily reaches a rather high level. Notwithstanding, an operation of this character is at times conducted utilizing two stages in which a practically 100% conversion of the oxides of carbon is achieved.

Operations of this character have not been entirely satisfactory owing to the relatively large pressure drop which normally results from circulating the relatively large quantity of gas. In order to overcome this, it has been suggested that the operation be conducted at relatively high pressures in order to decrease the total amount of energy loss resulting from the pressure drop. However, even when operating at these elevated pressures the cost of circulating the gas is relatively high and in many instances prohibitive. In addition, the investment required for handling these relatively large quantities of gas at high pressures using conventional chamber and piping design, is commercially impractical.

I have now discovered that the energy loss resulting from the circulation of relatively large quantities of synthesis gases is considerably reduced by utilizing a particular type of reactor. When carrying out the process utilizing my reactor, the pressure drop is substantially decreased by maintaining relatively low linear velocities and by eliminating the excessive pressure drop due to the effects of bends, turns, contractions, expansions, and other irregularities in the path of flow of the synthesis gases. Furthermore, my reactor has relatively low area of pressure resisting wall surfaces in that it is self-contained and unitized.

Figure 2:
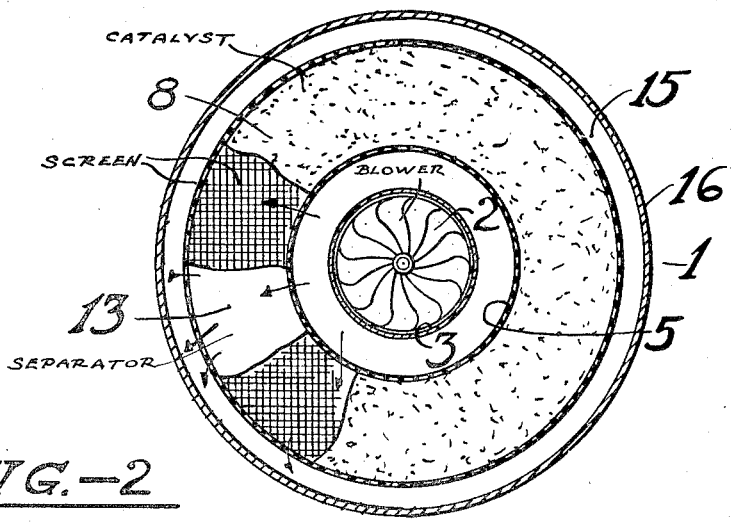

My process and reactor may be readily understood by reference to the drawing illustrating an embodiment of the same. Figure 1 illustrates the reactor in elevation while Figure 2 is a cross-sectional view II—II. The reaction zone comprises a circular cylindrical element 1 comprising a number of concentric annularly disposed sections. The circulating synthesis gas leaves vertical blower 2 and flows upwardly through the innermost section 3 of a number of concentric sections. At the top of the reactor the direction of flow of synthesis gases is reversed in a sweeping bend 4 and the synthesis gases flow downwardly through the annular area between concentric section 3 and the next disposed concentric section 5. A number of annular catalyst beds 6, 7, 8, 9 and 10 are concentrically disposed around section 5. Each catalyst bed is separated from the other by a series of conical frustrum separators 11, 12, 13, and 14 respectively. The catalyst beds and separators are so arranged that the circulating gases flowing downwardly in the annular area between concentric section 3 and concentric section 5 may pass through the catalyst beds in parallel flow. A final annular space 15 is provided intermediate the catalyst beds and the outer shell 16 of reactor 1. There are provided in concentric section 5 and in the section forming the outer side of the catalyst beds, means which may comprise slots, perforations, or other openings such that the gases flowing downwardly in the area between concentric section 3 and concentric section 5 may readily enter the catalyst beds and so that the gases from the catalyst bed may readily enter annular area 15. The gases in the annular area 15 flow downwardly toward the bottom of the reactor. In the bottom of the reactor an annular cooling means 17 is provided for cooling the circulating gas. This may comprise a water or oil cooler or may be a waste heat boiler or other suitable means. The cooling is so controlled that when the gas leaves the cooler through the central opening, heat has been removed equivalent to the exothermic heat of the synthesis reaction evolved in the catalyst beds. Blower 2 takes suction from the central space of the cooler and the circuit continued as described. Fresh synthesis gases are introduced immediately ahead of the blower by means of synthesis feed gas line 18 as required and product gases and vapors are removed at a point immediately ahead of the cooling compartment by means of the product outlet line. These gases may be removed at a plurality of points distributed around the perimeter at the level as shown.

The process of the present invention may be widely varied. The invention essentially comprises passing reaction gases through a particular type reactor designed in such a manner that minimum pressure drop results when a relatively large volume of gases is recirculated to the catalyst beds after withdrawing the same from the catalyst beds and cooling. Although the process may be adapted to the removal of exothermic heat of reaction and for maintaining a substantially constant temperature in any type of chemical reaction, it is particularly adapted for a process for the production of relatively higher boiling constituents from oxides of carbon and hydrogen. These reactions, depending upon the character of the feed gases and yield of particular product desired, may be conducted under various temperature and pressure conditions. In general, however, in a process for the production of hydrocarbon constituents containing more than one carbon atom in the molecule, depending on the catalyst employed, the preferred temperature of reaction lies in the range from about 350° F. to 650° F. In order to secure satisfactory yields of the desired product, it is essential that the temperature variance from the operating temperature not exceed about 10° F., and preferably not exceed about 5° F., the exact limitations depending, again, upon the catalyst employed.

Any suitable catalyst may be employed which will function to aid the reaction between the hydrogen and the oxides of carbon at the operating temperatures and pressures. Suitable catalysts are for example, cerium, chromium, cobalt, manganese, osmium, palladium, titanium, zinc, iron and oxides or other compounds of these metals. Mixtures of these catalysts may be employed or the same may be impregnated with suitable agents adapted to increase their efficiency or strength. The catalysts may be in pilled form or granular form.

These operating requirements are satisfied using my operation and reaction zone. It is to be understood that a number of such units may be utilized and arranged as desired. Fresh synthesis gas is required as input. The cooling-condensing means and product recovery system is adapted to handle the total gases circulated. Each unit is self-contained insofar as gas circulation and removal of heat of reaction is concerned.

Due to the unitary character of my reactor, it is necessary that only the outer shell be made to stand the operating pressure. The interior equipment, including the catalyst beds as well as the various annular separators, need be designed only to support their own weight and that of the catalyst. Inlet from the gas distribution annulus and outlet to the gas collection annulus may conveniently extend entirely around the inner and outer perimeter of the catalyst beds respectively. Thus excellent distribution of the gas flow is obtained. Control of the flow of gases through individual beds is preferably obtained by providing movable cylindrical sleeves which partially block the circumferential inlets and outlets to the respective catalyst zones.

Dimensions of the equipment may be such as to give any desired pressure drop. In general it is preferred that the linear velocities not exceed about 50–100 feet per second. Also by the introduction and removal of the circulating gas through circumferential spaces, the contraction and expansion losses, normally most difficult to overcome in a process of this kind, are materially reduced.

Although annular arrangements are preferred, it is to be understood that under certain conditions other arrangements may be employed. For example, an arrangement in which parallel-sided sections replace the annular sections would have the advantage of giving less perimeter for a given area of gas flow. Distribution difficulties however, are greater and design and construction is more difficult. The use of conventional connecting piping inside a pressure holding shell, although having the advantage that only one surface need be designed for pressure, has the disadvantage that particularly high contraction and expansion losses are suffered at inlet and outlet points.

Additional refinements of my process and reactions may be employed. Under certain conditions, for example, the innermost cylinder 3 may be removed since the purpose of this duct is to make possible the introduction and withdrawal of the total circulating gas at opposite ends of the column of catalyst beds in order to improve distribution. Another modification of my reaction chamber may be to reverse the flow from that described. Also the entire unit may be inverted from a mechanical viewpoint. If the central rise be employed, the positions of the annular inlet and outlet headers may be reversed in order to give bend 4 a greater radius.

What I claim as new and wish to protect by Letters Patent is:

1. An improved process for conducting catalytic reactions in which the exothermic heat of reaction is removed and catalyst temperature is controlled by the recirculation of a relatively large volume of the reacting gas mixture, which comprises the steps of passing a mixture of fresh and recirculated feed gas in a radial direction through an annular catalyst bed, withdrawing a minor portion of the gas which has passed through the catalyst bed, cooling a major portion of the remainder of such gas and admixing the cooled gas with fresh reaction gas prior to recirculation, the cooling being adjusted to substantially correspond to the exothermic heat of reaction and thus maintaining reaction temperature.

2. Process according to claim 1 in which the feed gas comprises a mixture of hydrogen and an oxide of carbon.

3. Process according to claim 1 in which the proportion of the recirculated gas is such that the catalyst temperature rise through the catalyst bed is less than 10° F.

4. An improved process for conducting catalytic reactions in which the exothermic heat of reaction is removed and catalyst temperature is accurately controlled, which comprises feeding a mixture of fresh and recirculation feed gas radially through an annular catalyst bed from an interior zone surrounded by the catalyst bed to an exterior zone surrounding the catalyst bed, withdrawing a minor portion of the gases from the exterior zone, passing a major portion of the remainder of such gas through a cooling zone and mixing the cooled gas with fresh feed before recirculation, the cooling being adjusted to correspond to the heat of reaction and thus maintain catalyst temperature.

FRANK T. BARR.